United States Patent
Diclaro, II et al.

(10) Patent No.: US 9,089,121 B2
(45) Date of Patent: Jul. 28, 2015

(54) FLY ATTRACTANT SYSTEM WITH TOXICANT-TREATED CORDS

(75) Inventors: Joseph W. Diclaro, II, Fleming Island, FL (US); Roberto M. Pereira, Gainesville, FL (US); Jeffrey C. Hertz, Okinawa (JP); Philip G. Koehler, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 879 days.

(21) Appl. No.: 13/250,440

(22) Filed: Sep. 30, 2011

(65) Prior Publication Data

US 2013/0081324 A1  Apr. 4, 2013

Related U.S. Application Data

(63) Continuation-in-part of application No. PCT/US2010/030093, filed on Apr. 6, 2010.

(60) Provisional application No. 61/167,545, filed on Apr. 8, 2009.

(51) Int. Cl.
*A01M 1/02* (2006.01)
*A01M 1/20* (2006.01)
*A01M 1/04* (2006.01)
*A01M 1/10* (2006.01)
*A01M 1/14* (2006.01)

(52) U.S. Cl.
CPC . *A01M 1/04* (2013.01); *A01M 1/02* (2013.01); *A01M 1/106* (2013.01); *A01M 1/145* (2013.01); *A01M 1/20* (2013.01); *A01M 1/2016* (2013.01)

(58) Field of Classification Search
USPC .............. 43/107, 114, 115, 124, 131, 132.1
See application file for complete search history.

(56) References Cited

U.S. PATENT DOCUMENTS

| | | | | |
|---|---|---|---|---|
| 3,581,429 A | * | 6/1971 | Hickman et al. | 43/107 |
| 4,133,137 A | * | 1/1979 | van Adelsberg | 43/114 |
| 4,793,092 A | * | 12/1988 | Avittan | 43/122 |
| 4,930,251 A | | 6/1990 | Crisanti | |
| 4,986,024 A | | 1/1991 | Peek | |
| 5,018,299 A | | 5/1991 | Peek | |
| 5,094,027 A | * | 3/1992 | Smotherman | 43/60 |
| 5,170,583 A | | 12/1992 | Coaker | |
| 5,461,822 A | | 10/1995 | Green | |
| 6,202,341 B1 | * | 3/2001 | Bernard | 43/122 |
| 6,389,740 B2 | | 5/2002 | Perich | |
| 6,516,558 B1 | * | 2/2003 | Lingren et al. | 43/107 |
| 6,772,556 B1 | | 8/2004 | Liu | |

(Continued)

*Primary Examiner* — David Parsley
(74) *Attorney, Agent, or Firm* — Brian S. Steinberger; Law Offices of Brian S. Steinberger, P.A.

(57) ABSTRACT

Systems, devices, apparatus and methods of attracting and capturing flies with toxicant treated darkened cords and printed or painted strips on sidewalls of housings. The darkened cords and strips black to confuse flies into believing they are cracks and crevices. Flies feed off the insecticide treated strips and are killed over time. At least one black line over a blue background can simulate a harborage to attract flying insects. At least one black line over a sticky surface card can be used. Geometrical housing shapes can include triangular, pentagon, cylindrical, rectangular, square, cube and/or other geometrical shapes. Housings can be tied off to be suspended. Second housings can be suspended beneath a main housing by attaching strips to the lower suspended housing. The housings can also work in an unassembled state where planar type sheets can be mounted on a wall.

19 Claims, 19 Drawing Sheets

(56) References Cited

U.S. PATENT DOCUMENTS

| | | | |
|---|---|---|---|
| 7,856,753 B2 * | 12/2010 | Fisher .......................... 43/122 |
| 2005/0144831 A1 | 7/2005 | Knauf |
| 2006/0016120 A1 | 1/2006 | Masters |

* cited by examiner

US 9,089,121 B2

FLY ATTRACTANT SYSTEM WITH TOXICANT-TREATED CORDS

CROSS REFERENCE TO RELATED APPLICATIONS

This invention claims the benefit of priority to U.S. Provisional Application 61/167,545 filed Apr. 8, 2009, and International Application PCT/US2010/030093 filed Apr. 6, 2010.

GOVERNMENT LICENSE RIGHTS

This invention was made with government support under Eval of New Tech for Protection of Military Personnel; contract number W81XWH-04-1-0868, awarded by the U.S. Army. The government has certain rights in the invention.

FIELD OF INVENTION

This invention relates to flying insect attractants, in particular to systems, devices, apparatus and methods of attracting and capturing fly type insects with toxicant treated cords and strips attached to sidewall surface(s) of housings.

BACKGROUND AND PRIOR ART

Over the years various techniques, devices and systems have been proposed to trap pests such as flies and other flying insects with limited results.

U.S. Pat. No. 6,772,556 to Biao describes cylinders that having parallel strings across an opening, abstract, where narrow spaces between the strings will eventually trap the flies in the cylinder which can also have insecticides and/or other attractants, and the reference mentions colors such as "black" as an attractant color. The string is not treated and is stretched across the opening of the trap in accordance to the size of the insect that is being trapped. The 556 patent uses string stretched over an opening. This trap does not specify any visual attraction.

U.S. Pat. No. 5,018,299 to Peek describes fly decoys formed from "yarn . . . impregnated with an attractant" with "pesticide" and affixed to a structure by "tack, magnet or adhesive", abstract, and the yarn can be "black", column 2. This patent just says that black is attractive which is wrong since black does not attract by itself.

U.S. Pat. No. 4,986,024 to Peek describes a cylindrical shaped "sleeve" with attractant and pesticide, abstract, from which the treated yarn strips described in the Peek '299 can hang from Peek '024 uses an absorbent piece of string or yarn inside of the cylinder for pesticide delivery that does not specify nor recognize the use of any colors that can be used as attractants.

U.S. Pat. No. 5,461,822 to Green describes a trap where flies are lured in by a food source and the flies pass through a funnel and can not exit therefrom. Green '822 describes a "cylindrical . . . shell" having an inverted "funnel" inside having edible food type bait, and a "string" hanging below the funnel as a landing platform so that flies can go up the string inside of the inverted funnel and get trapped inside.

Much of the prior art is used to generally trap insects with chemical attractants and baits and not for attracting insects with colors. Many of the prior art attractants can have unpleasant odors and smells and need constant ventilation which restricts their use to outdoors. Thus, much of the prior art cannot be used indoors since they have unpleasant smells and odors that emanate therefrom.

Much of the prior art is limited to cylindrical type containers that may not be useable in all indoor and outdoor applications, as well as not be aesthetically pleasing in view of their shapes.

Additional prior art devices have expensive components and would not be economical or user friendly to both indoor and outdoor applications.

Thus, the need exists for solutions to the above problems with the prior art.

SUMMARY OF THE INVENTION

A primary objective of the present invention is to provide devices, apparatus, systems and methods of both attracting and killing flying insects such as flies, at a single location with a visual attractant and not limited to chemical or bait type attractants.

A secondary objective of the present invention is to provide devices, apparatus, systems and methods of using darkened insecticide treated strips attached to a solid side surface to simulate a crack or crevice so as to confuse and attract flies to believe the darkened strips are shelter in order to attract and kill the flies.

A third objective of the present invention is to provide devices, apparatus, systems and methods of both attracting and killing flying insects such as flies, at a single location that easily used indoors as well as outdoors.

A fourth objective of the present invention is to provide devices, apparatus, systems and methods of both attracting and killing flying insects such as flies, at a single location with attractants that are without any unpleasant odors and are odor free.

A fifth objective of the present invention is to provide devices, apparatus, systems and methods of both attracting and killing flying insects such as flies, at a single location with an inexpensive insect attractant system with toxicant treated cords.

A sixth objective of the present invention is to provide devices, apparatus, systems and methods of both attracting and killing flying insects such as flies, at a single location with devices that can have various shapes such as but not limited to cylinders, squares, rectangles, triangles, pentagons and other geometrical shapes and combinations thereof.

A seventh objective of the present invention is to provide devices, apparatus, systems and methods of both attracting and killing flying insects such as flies, at a single location with devices having an insecticide treated darkened stripe(s) such as an insecticide treated print or painted lines over a fly attractant background such as blue.

An eighth objective of the present invention is to provide devices, apparatus, systems and methods of both attracting and killing flying insects such as flies, at a single location with devices having an insecticide treated darkened stripe(s) such as an insecticide treated natural fiber cord over a fly attractant background such as blue.

The invention does not trap live insects. It is used to kill the insects with insecticide bait and/or with a residual product in the string.

For the invention the dark insecticide treated stripes, such as printed or painted stripes or natural fiber cords treated with insecticide are on the outside surface of the housing to serve as a visual attractant. The invention combines the visual attraction with a food attractant.

In an embodiment, the invention uses the black yarn to simulate a crack that the fly would seek for shelter. The invention does not use a fly shape to attract flies. The invention can use the attractive background color of the housing and the yarn stripe together to attract flies to a simulated crack. Black is not an attractive color to flies, except when it is placed in front of an attractive color like blue or white.

The invention can use black yarn which needs to be on the outside of the housing and in one embodiment can connect two cylinder housings together. The inventors have determined that using treated yarn inside a trap or just across openings is not as effective as having black yarn stripe in front of an attractive color such as a blue background. In the subject invention the fly can be attracted at a distance to the color of the housing. Once in close, the fly thinks the black yarn is a crack and goes to the black yarn. The yarn can be treated with either a bait or residual product that kills the fly as it feeds or contacts the yarn. In one embodiment, the inventors have determined that wool is the best product for delivery of insecticide.

Unlike being restricted to a cylinder shape, the invention can have trap that can include a square or rectangular shape rather than a cylinder and that will work well. The preferred embodiments of the invention devices are not for trying to trap insects such as flies, just to attract them and kill them at the device.

One embodiment of the invention is the combination of having two cylinders with yarn strips running down the sides of the cylinders and creating a space between the cylinders, and using the blue chloroplast rolled material.

The invention can use the color blue as a background color substantially across the face of the housing with black stripe lines that simulate a harborage for flies as being attractive to the flies.

Another embodiment can use a blue or white colored card, with a black stripe line(s) thereon, with the card having a sticky(adhesive) exterior surface that can be used in light traps.

The cords that can be used can include but are not limited to a natural fiber cord, such as but not limited to a wool cord, a wool blend, combinations thereof, and the like.

Other geometrical shapes for the housings can include single or plural triangular shapes, pentagon shapes, cubes, squares, and rectangular shapes. All of the housings can have an attractive exterior color, such as white, and preferably blue, with contrasting stripes, such as dark colors, preferably black, thereon.

For outdoor use, the housings can have both their top ends and bottom ends tied down so that they do not move in the wind. For indoor use, the housings can be tied down by only their top ends.

The housings are effective to attract and kill flies when being used in both their unassembled and assembled states Further objects and advantages of this invention will be apparent from the following detailed description of the presently preferred embodiments which are illustrated schematically in the accompanying drawings.

DESCRIPTION OF THE PREFERRED EMBODIMENTS

Figure 1:
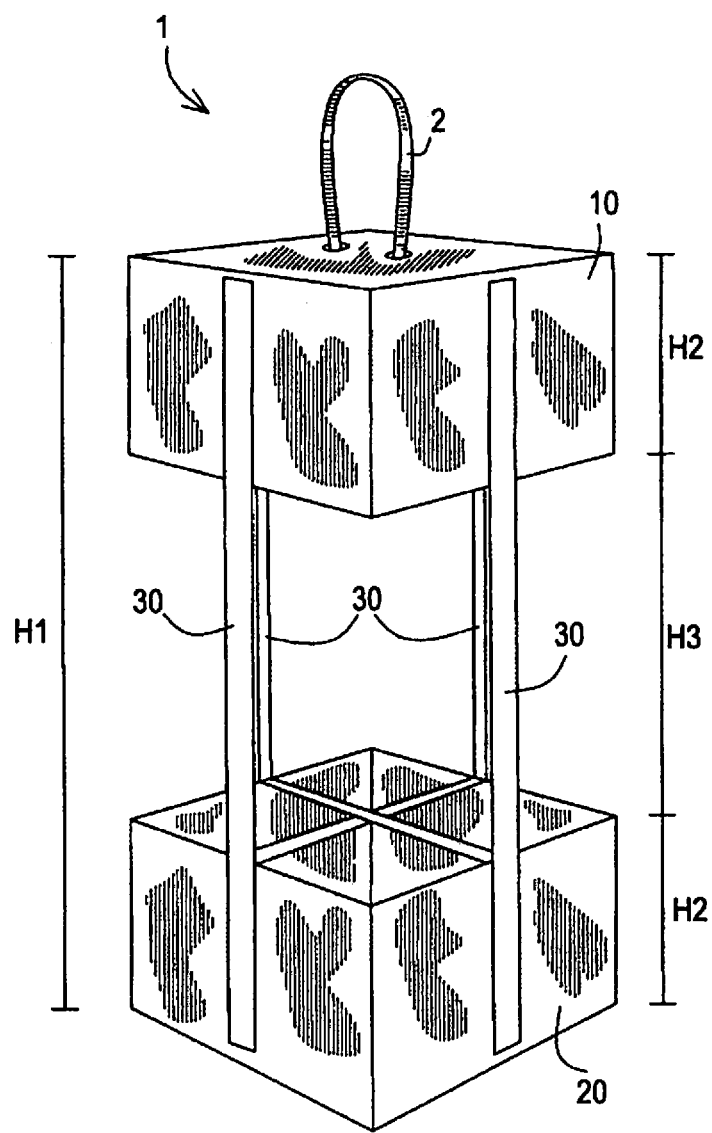
FIG. 1 is a perspective view of two housing containers suspended from one another, with strips/cords of treated yarn attached to the side surfaces of the containers.

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

The components of a preferred embodiment will now be listed.

1. Double box hanging embodiment
2. hanger strip
10. upper container housing
20. lower container housing
25. closed floor/bottom of lower container
30. outer yarn strip(s)/cord(s)
40. cross-brace yarn strip(s)/cord(s)
50. Double cylinder hanging embodiment
52. hanger strip
60. upper cylinder
70. lower cylinder
80 outer yarn strip(s)/cord(s)
85. cross-brace yarn strip(s)/cord(s)
90 collector container
100. Sticky card
102. Hanging member
110 Surface with glue/adhesive layer
120 Elongated narrow line(s)

200. triangular housing
210. first rectangular section
212. left tabs
213. slot
214. top tab
215. slot
216. bottom tab
217. rectangular cut-out
218. treated stripes
220. second rectangular section
223. slot
224. top tab
225. slot
226. bottom tab
227. rectangular cut-out
228. treated stripes
230. third rectangular section
231. slot
232. right tab
233. slot
237. rectangular cut-out
238. treated stripes
240. upper triangular section
242. left tab
244. right tab
246. triangular cut-out
247. through-hole
250. lower triangular section
252. left tab
254. right tab
256. triangular cut-out
257. through-hole
300. pentagon shaped housing
400. rectangular shaped housing FIG. 1 is a perspective view of two hanging housing containers 1 suspended from one another, with strips/cords 30 of treated yarn attached to the side surfaces of the containers 10, 20. Each of the containers 10, 20 can have a rectangular box configuration.

Figure 2:
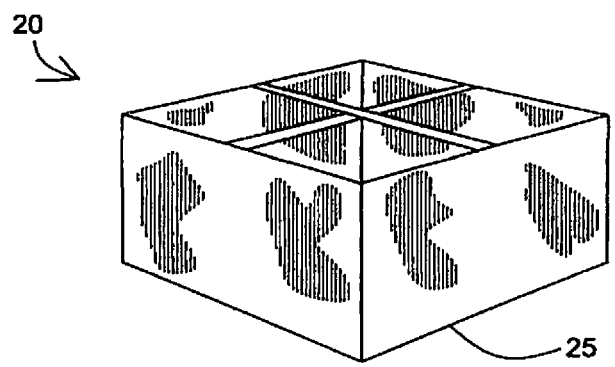
FIG. 2 is an enlarged view of the suspended lower housing container of FIG. 1.

FIG. 2 is an enlarged view of the suspended lower housing container 20 of FIG. 1, with the cross-brace yarn strip(s)/cords 40 across the upper open end of the housing container.

Figure 3:
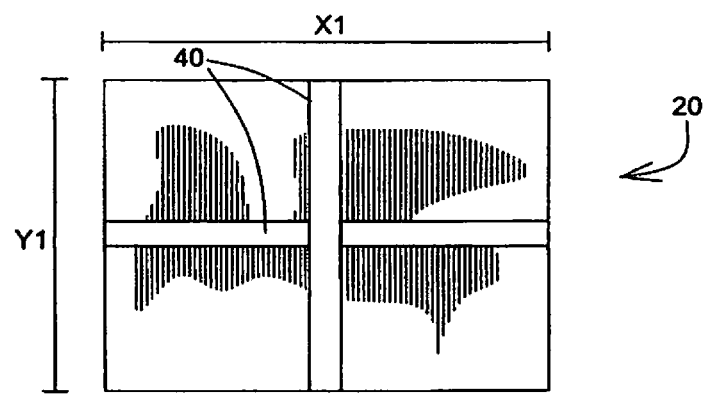
FIG. 3 is a top view of the suspended lower housing container of FIG. 2.

FIG. 3 is a top view of the suspended lower housing container 20 of FIG. 2 showing the cross-brace yarn strip(s)/cord(s) e.

Referring to FIGS. 1-3, a preferred embodiment of the invention allows for having two or more boxes 10 and 20 that can have rectangular shapes stacked on top of one another and connected to one another by a darkened insecticide treated yarn 30. Each box 10 and 20 can be formed from blue Coroplast® sign board material. The darkened yarn can be natural fiber cords, such as but not limited to approximately 100% wool black yarn strips such as but not limited to Wool-Ease®, color black 153. The yarn strips/cords 30 can be treated with an insecticide attractant by soaking the strips in approximately 2.5% imidacloprid bait (Maxforce® Fly Spot bait, by Bayer CropScience, Kansas City, Mo. 64120, for approximately 1 minute.

Upper portions of four yarn strips/cords 30 can be attached across mid portions of the side wall surfaces of the upper container 10 by adhesives, such as glue, and the like. Lower portions of the four yarn strips/cords 30 can be attached across mid portions of the side wall surfaces of the hollow lower containers 20 also by adhesives, so that there can be a gap between the bottom of the upper container 10 and the top of the hollow lower container 20.

Across the top of the lower container 20 and optionally across the bottom of the upper container 20 can be cross-brace strips 40 of the treated yarn which can act as cross-braces for holding the shapes of the box shaped containers 10, 20. The bottom of the lower container 20 can also have a floor 25 so that any flies which are killed drop inside.

Each of the box shaped containers 10, 20 can have lengths X1 and widths Y1 of approximately 13 cm, with a height H2 of approximately 8 cm. The boxes can be separated H3 at approximately 14 cm apart, so that the overall vertical height H1 of the upper container 10 with suspended bottom container 20 can be approximately 30 cm. A hanger 2 such as a flexible plastic strip attached to the top of the upper container 10, can allow for hanging the double box shaped hanging containers 1 to trees, from underneath tables, signs, posts, and the like, in both indoor and outdoor applications.

From a distance the insects such as flies can be attracted to the blue color on the sides of the box shaped containers 10, 20, and the black strips 30 can confuse the flies to believe the black strips 30 are cracks or crevices, which a fly can perceive as a shelter. The fly will land on the yarn strips, and believe it is food, where once they feed on the strips the flies can die within seconds to minutes.

Figure 4:
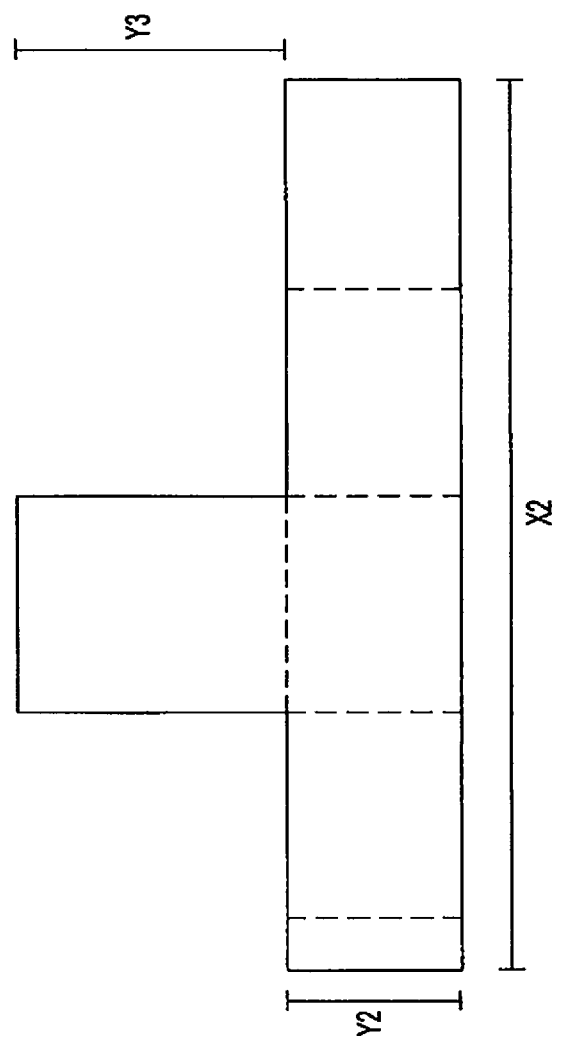
FIG. 4 shows a sheet of material formed for creating one of the housing containers.

FIG. 4 shows a sheet of material formed for creating each of the housing containers 10 and 20. A single sheet of material such as a plastic sheet can be manufactured or formed in an upside down T-shape, having a 54 cm length X2 with 8 cm height Y2, with a 13 cm by 13 cm block portion extending upward from near a mid portion of the 54 cm length portion. The user, can fold the 54 cm portion into a box shape such as the containers 10, 20 shown in the previous figures, and cover one open end with the flap formed by the 13 by 13 cm section. Adhesives, such as glue, and/or fasteners such as stapes can hold the walls and flap together. Also two crossed pieces of the yarn strips/cords 30, 40 can be attached across the opposite open end as well to help keep the box shape in place.

The hanging containers 10, 20 can resemble small boxes, such as those sold in Chinese restaurants, and the like. The boxes and containers 10, 20 can also be easily stored in their flattened state as shown in FIG. 4 so that the materials do not take up much room and are easily transportable.

The sheets of materials can also be formed and pre-attached together so that pulling the containers apart forms the overall assembled shapes(box shapes) 10, 20 of the containers without having to do any other assembly.

The yarn strips/cords 30 between the two containers can be held taught by the weight of the lower hanging container 20.

Figure 5:
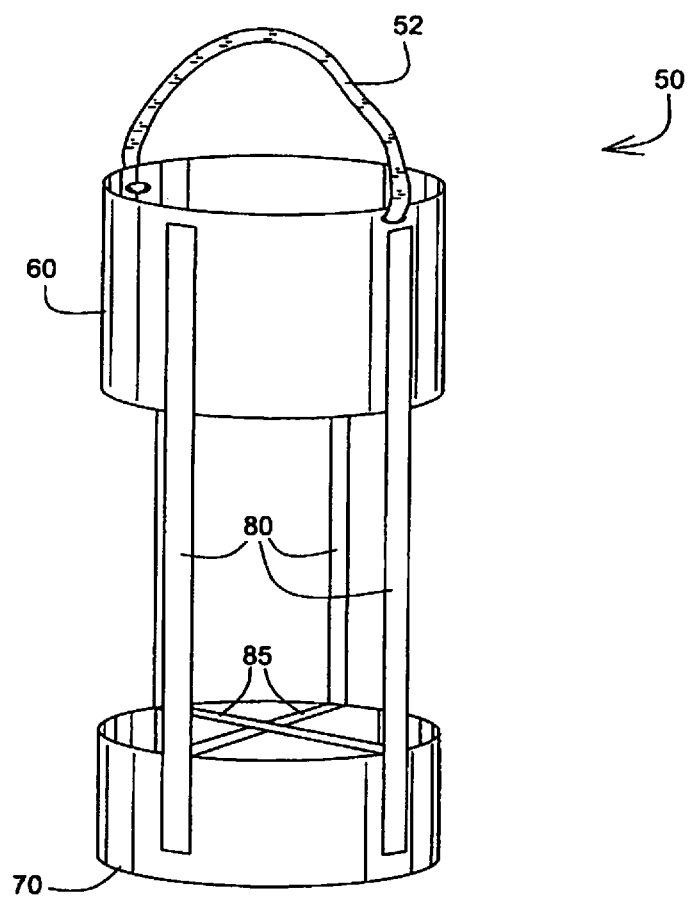
FIG. 5 is a perspective view of the experimental setup of the invention using cylindrical shaped containers suspended from one another by the yarn strips/cords.
Figure 6:
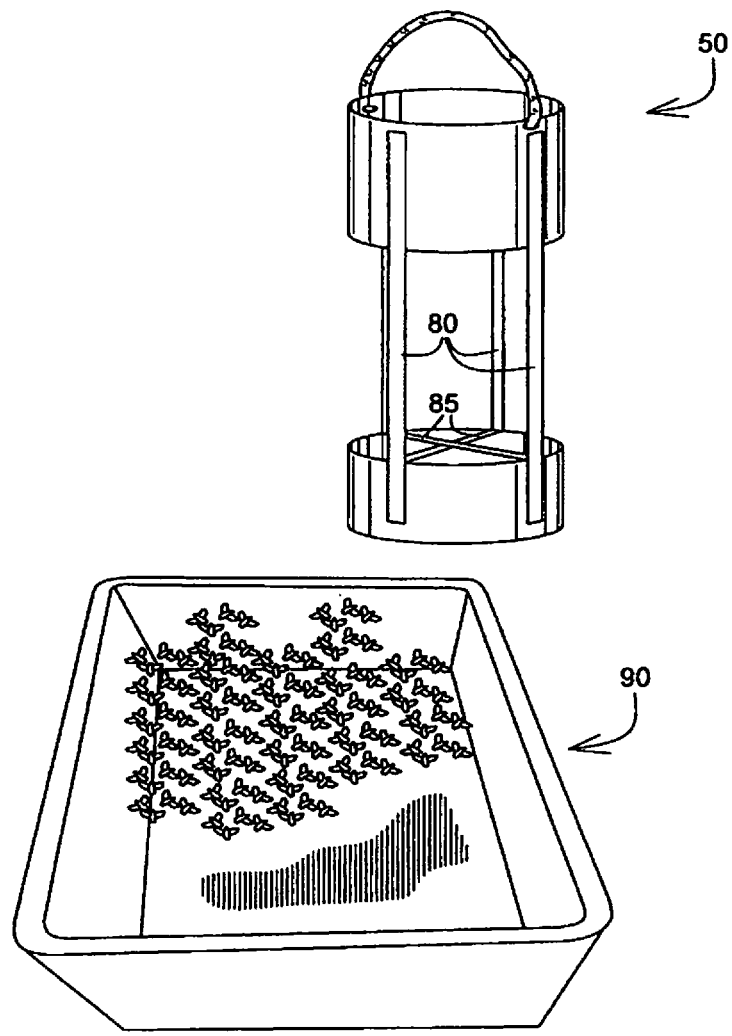
FIG. 6 is another view of the setup of FIG. 5 above a container to collect the killed flies.

FIG. 5 is a perspective view of the experimental setup of the invention double cylinder hanging strips 50, using cylindrical shaped containers 60, 60 suspended from one another by the yarn strips/cords 80. A hanging strip 52 can be used to hang the device in place. FIG. 6 is another view of the setup 50 of FIG. 5 above a container 90 to collect the killed flies.

Referring to FIGS. 5-6, the invention was reduced to practice by forming two cylinders 60, 70 stacked on top of one another connected to each other by black insecticide treated wool yarn strips 80. The top cylinder 60 can be made of blue Coroplast® sign board material that was cut in 38×11 cm strip and rolled up in a cylinder shape of approximately 12.5 cm diameter with ends hot glued together. A 237 ml clear plastic deli cup (8 ox clear plastic container, #APCTR08; American Plastic Industries Ltd. Chattanooga; Tenn.) was hot glued inverted to the bottom of the top portion of the device.

A 13 cm long piece of insecticide treated black yarn strip 80 was extended across the open end of the cup and glued in place with hot glue. The bottom cylinder 70 was similar to the top cylinder 60 with a 38×7 cm blue plastic sign board used.

A deli cup was hot glued inside the bottom portion of the device. Across the open upper end of the bottom portion of the device were two 13 cm pieces of 13 cm long insecticide treated black yarn strips 85 across the open end with ends hot glued in place. The yarn strips 80, 85 were Wool-Ease®, color back 153. The yarn strips 80, 85 were treated with an insecticide attractant by soaking the strips in approximately 2.5% imidacloprid bait (Maxforce Fly Spot bait, by Bayer CropScience, Kansas City, Mo. 64120, for approximately 1 minute. A composition can be the combination of the treated yarn strips.

The two cylinders 60, 70 were connected by four evenly spaced parallel 30 cm long treated pieces 80 of wool yarn 5 mm in diameter extending from the top to bottom portions of the device 50, which were separated by an approximately 11 cm space.

The fly attractant experimental device with toxicant treated cords 80, 85 was placed near fly infested garbage cans, which eliminated 3006 flies in 24 hours.

Figure 7:
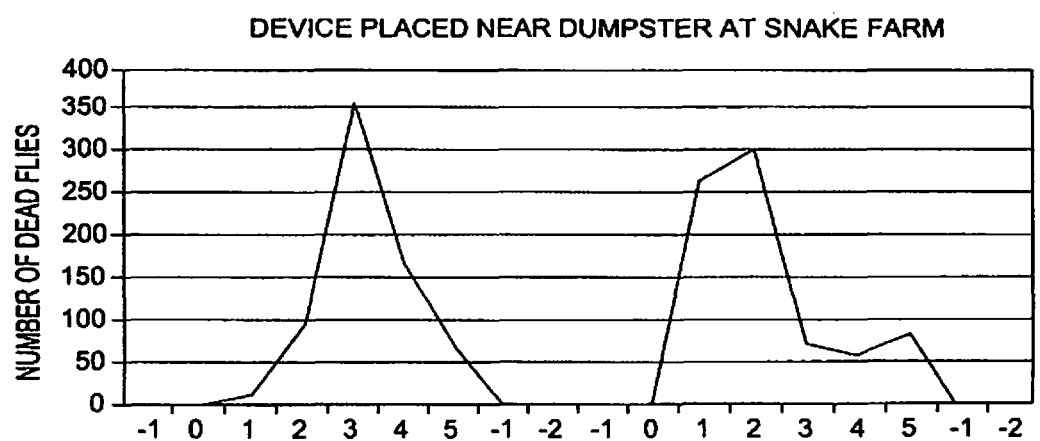
FIG. 7 is a graph of the number of dead flies while the experiment was running.

FIG. 7 is a graph of the number of dead flies while the experiment was running. This graph shows the number of dead flies killed by the fly attractant system with toxicant treated cords near a house fly infested dumpster on a snake farm. The referenced numbers are the number of days the device was in service, with zero representing the days the device was put in place.

Figure 8:
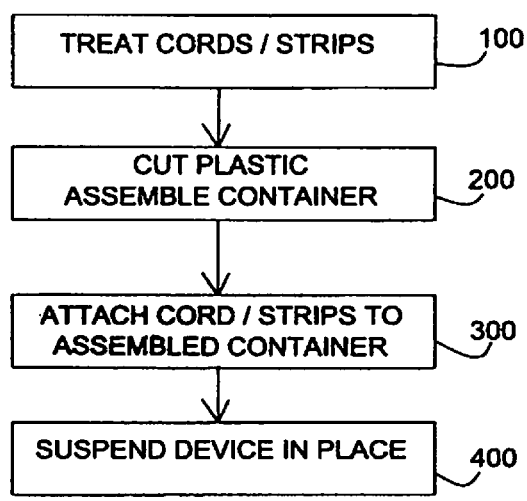
FIG. 8 shows the method steps for forming the fly attractant and fly kill device.

FIG. 8 shows the method steps for forming the fly attractant and fly kill device. A first step 100 can be to treat the cords/strips, such as the black natural fiber cords with an insecticide. The second step 200 is to cut and assemble the plastic materials include box containers or cylinder containers. The third step 300 can be to attach the treated cords/strips to allow for the containers/cylinders to be suspended from one another, and the fourth step 400 is to hang the double suspended containers in an indoor and/or an outdoor location to attract flying insects with the color attractant and to kill those insects.

Figure 9:
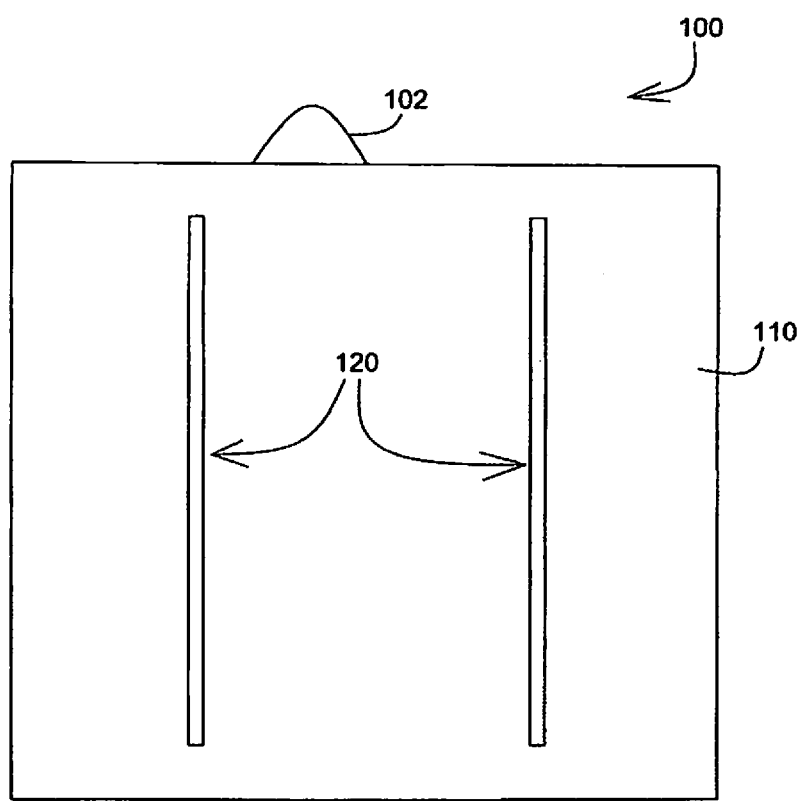
FIG. 9 shows a "sticky card" embodiment of the invention with line(s)/elongated members of one color on a substrate of a contrasting color.

FIG. 9 shows a "sticky card" embodiment of the invention with line(s)/elongated members of one color on a substrate of a contrasting color.

The card can have be made of cardboard or thin plastic sheet 100 and have dimensions of approximately 3" by approximately 5", up to approximately 18" by approximately 10", or more. The card can have a waterproof surface or waterproof surface coating thereon, with a sticky glue adhesive layer 110 on either the front or the back, or on both surfaces of the card 100. Vertical or horizontal line(s) 120 can run down or across the card surface 110, and be of a different color that contrasts with the solid color of the substrate surface 110. The card 100 can be hung from a support by a hanging member 102. The line(s) can be painted or printed on the substrate surface. The line(s) can also include insecticides in the line(s) or without insecticides.

One embodiment can use a blue or white colored card, with a black or dark line(s) thereon. Another embodiment can have a darkly colored card with a white or light colored elongated line member or members running down or across the card. A light trap embodiment can have a UV light behind the card that would appear to make the lighter colored line member(s) appear to be a crevice or crack.

The line or lines, can range from approximately 1/16" to approximately 1" wide, and preferably in the range of approximately 1/4" to approximately 1/2" wide. The length of the line(s) can range from approximately 3/4" to approximately 18" long. Also the length of the line(s) can be as long as the length or width of the card where the line(s) are used.

The contrasting colored line(s) can be a visual attractant to the flying insects, such as flies, where the surrounding "sticky" surface can trap the insects thereon. Also the line(s) can have insecticide as well to further kill the insects. Also, the line(s) can also have a "sticky" surface for trapping the insects.

Also, the "sticky" cards can have narrow diameter natural fiber cords (such as but not limited to black wool, and the like), attached to the surface as used in the previous embodiments.

Figure 10:
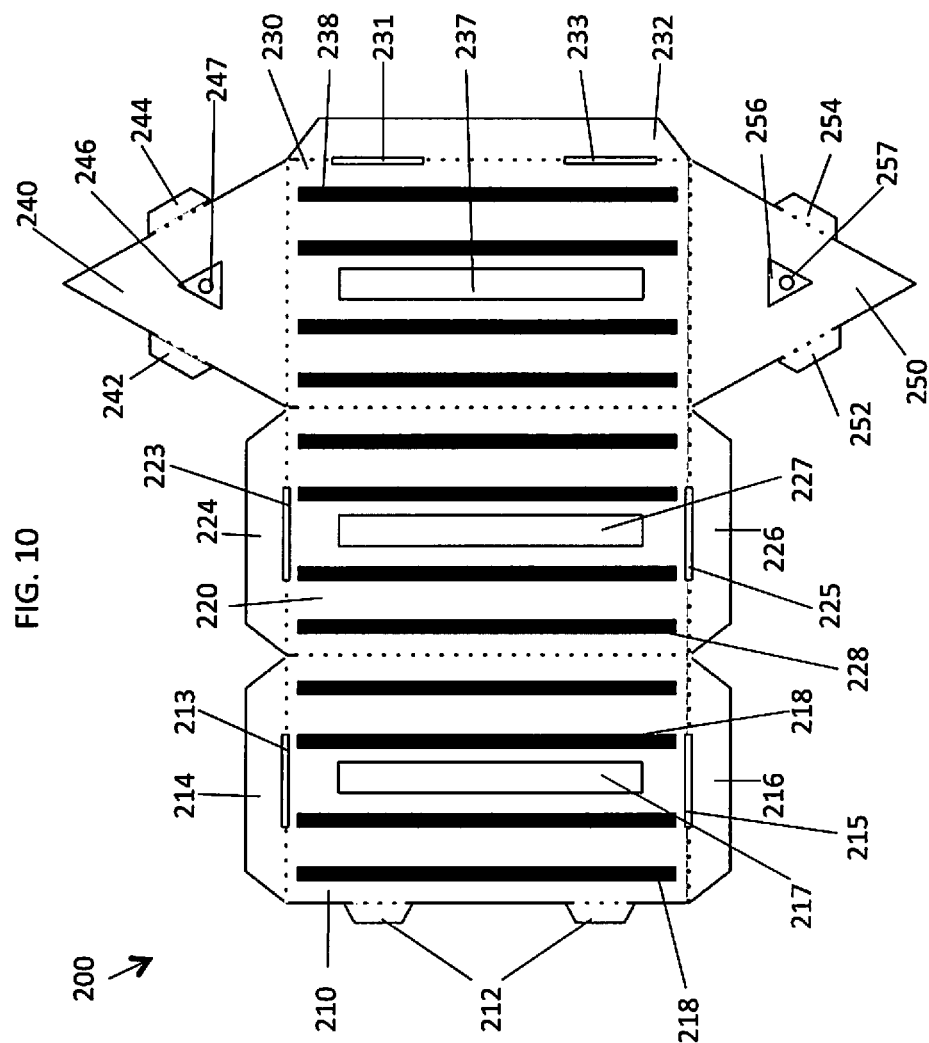
FIG. 10 is an unassembled view of a triangular shaped housing embodiment.

FIG. 10 is an unassembled view of a triangular shaped housing embodiment 200 that can be formed from plastic base sheet that is weatherproof and not degraded by the sun, such as 0.5 mm thick, such as the plastic binder type material, such as the materials previously described. A first rectangular section 210 can have a pair of left tabs that extend from the rectangular section and have perforations there between allowing the tabs to be bendable. Extending upward and downward from the rectangular section 210 can be a top tab 214 and bottom tab 226. A line of perforations separating the tabs 214 and 216 from the rectangular section 210 can also allow the tabs 214 and 216 to be bendable. Respective slots 213 and 215 can be located along a midportion of the perforated lines separating tabs 214 and 216 from the first rectangular section 210. A plurality of parallel narrow diameter insecticide treated stripes 218 each having a contrasting dark color, preferably black against a blue background. A rectangular cut-out 217 can be located down the middle of rectangular section 210.

A second rectangular section 220 can have a left side attached to the right side of the first rectangular section with another perforated line therebetween that allows the sections 210 and 220 to be bendable to one another. Extending upward and downward from the rectangular section 220 can be a top tab 224 and bottom tab 226. A line of perforations separating the tabs 214 and 216 from the rectangular section 210 can also allow the tabs 214 and 216 to be bendable. Respective slots 223 and 225 can be located along a midportion of the perforated lines separating tabs 224 and 226 from the first rectangular section 220. A plurality of parallel narrow diameter insecticide treated stripes 228 each having a contrasting dark color, preferably black against a blue background. A rectangular cut-out 227 can be located down the middle of the rectangular section 220.

A third rectangular section 230 can have a left side attached to the right side of the second rectangular section 220 with another perforated line therebetween that allows the sections 230 and 220 to be bendable to one another. A plurality of parallel narrow diameter insecticide treated stripes each having a contrasting dark color, preferably black against a blue background. A rectangular cut-out 237 can be located down the middle of the rectangular section 220. A right tab 232 can extend to the right side of the third rectangular section 230 and have a perforated line therebetween which allows for the tab 232 to be bendable relative to the third rectangular section 230. Two spaced apart slots 231, 233 can be located on the perforated line.

Extending upward from the third rectangular section 230 can be an upper triangular section 240 with a perforated line therebetween that allows the triangular section 240 to be bendable to the third rectangular section 230. A left tab 242 and a right tab 244 can be on opposite sides of the upper triangular section 240. Perforation lines can be between the tabs 242, 244 and the triangular section 240 to allow for the tabs 242, 244 to be bendable relative to the triangular section 240. A partial triangular cut-out (having sides cut out, and base connected), 246 can be located along a middle of the triangular section 240. The partial triangular cut-out can have a base with perforations that allows the cut-out 246 to raise up from the triangular section 240. A through-hole 247 in the partial cut-out 246 allows for ties, and the like to hang the assembled triangular housing or unassembled sheet in place.

Extending downward from the third rectangular section 230 can be an lower triangular section 240 with a perforated line therebetween that allows the triangular section 250 to be bendable to the third rectangular section 230. A left tab 252 and a right tab 254 can be on opposite sides of the lower triangular section 250. Perforation lines can be between the tabs 252, 254 and the triangular section 250 to allow for the tabs 252, 254 to be bendable relative to the triangular section 250. A partial triangular cut-out (having sides cut out, and base connected), 256 can be located along a middle of the triangular section 250. The partial triangular cut-out can have a base with perforations that allows the cut-out 256 to raise up from the triangular section 250. A through-hole 257 in the partial cut-out 256 allows for flexible ties, and the like to hold the hanging or assembled triangular housing or unassembled sheet in place.

Figure 11:
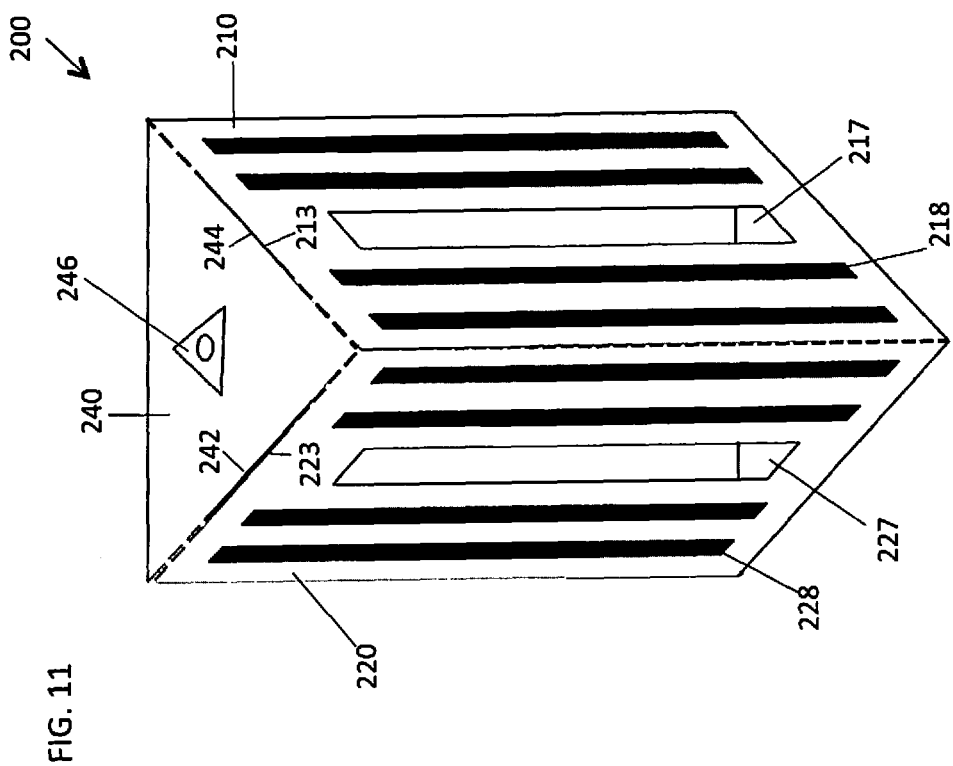
FIG. 11 is a perspective view an assembled triangular shaped housing of FIG. 10.

FIG. 11 is a perspective view an assembled triangular shaped housing 200 of FIG. 10. To assemble the housing, second rectangular section 220 can be folded forward with upward tab 224 folded downward. Upper triangular section 240 can be folded downward so that left tab 242 of upper triangular section 240 can slip into slot 223 of the second rectangular section 220. Similarly, tab 226 can be folded upward. Lower triangular section 250 can be folded upward so that tab 252 of the lower triangular section 252 can slip into slot 225 of the second rectangular section 220.

Right tab 232 of the third rectangular section can be folded forward. Next, upward tab 214 of the first rectangular slot 210 can be folded downward, and downward tab 216 can be folded upward. Next, first rectangular section 210 can be folded forward and around so that left tabs 212, 218 can slip into slots 231, 233 in the folded tab 232. Followed by bending tab 244 of upward triangular section 240 downward to slide into slot 213, and bending tab 254 upward to slide into slot 215 of the first rectangular section 210. A friction fitting of the tabs into their respective slots generally locks the triangular shape housing in place.

Figure 12:
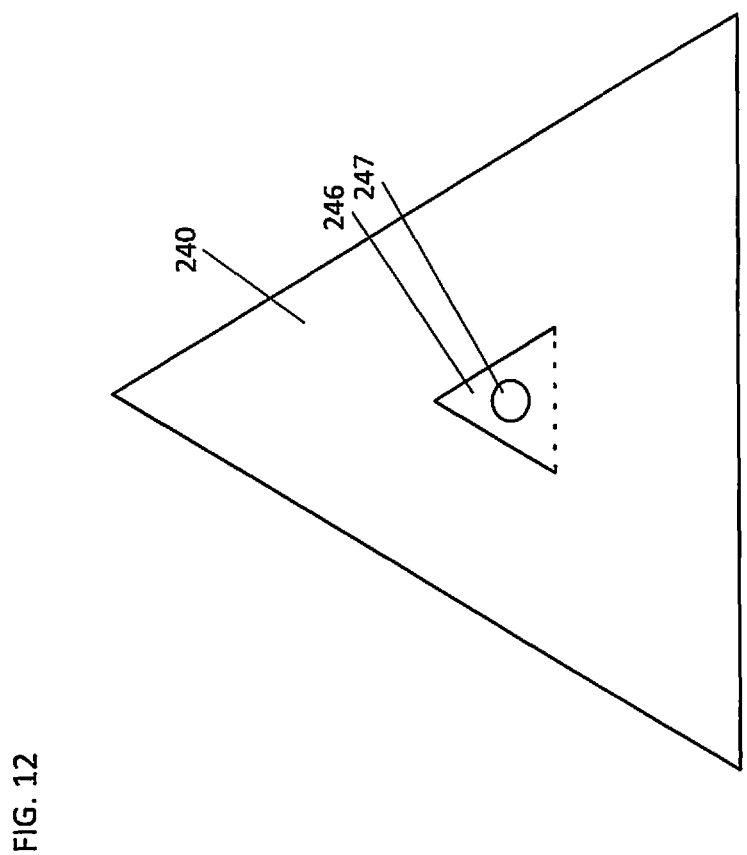
FIG. 12 is a top view of the assembled triangular housing of FIG. 11.
Figure 13:
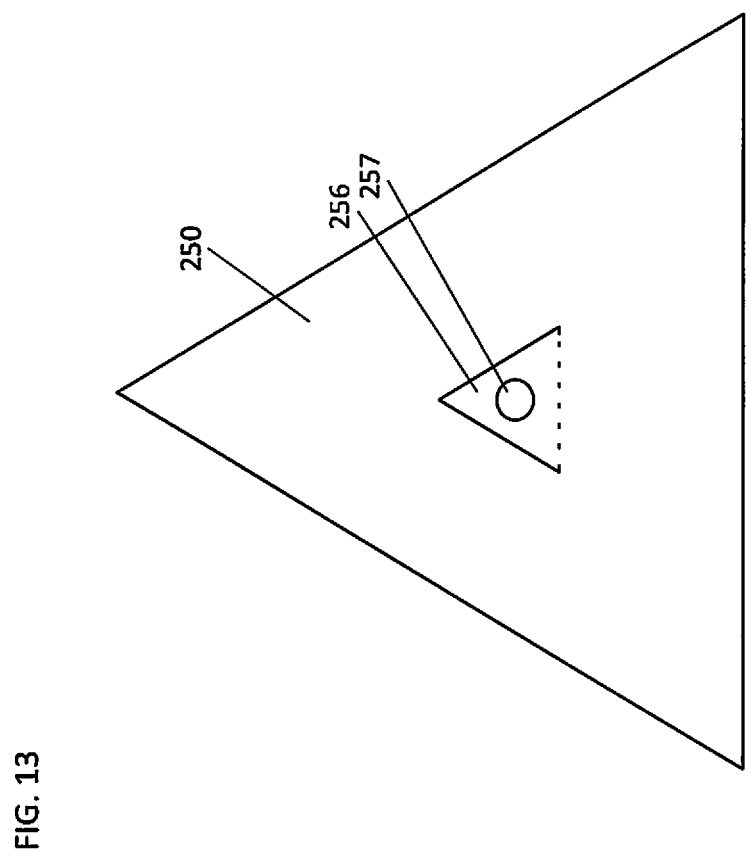
FIG. 13 is a bottom view of the assembled triangular housing of FIG. 11.
Figure 14:
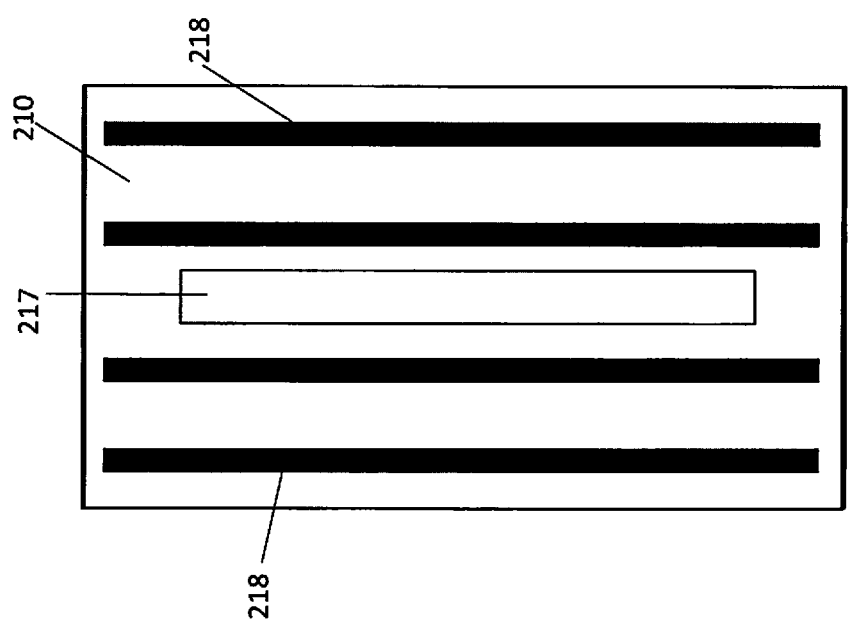
FIG. 14 is a side view of one of the faces of the triangular housing of FIG. 11.

FIG. 12 is a top view of the top 240 of the assembled triangular housing 200 of FIG. 11. FIG. 13 is a bottom view of the bottom 250 of the assembled triangular housing 200 of FIG. 11. FIG. 14 is a side view of one of the faces 210 of the triangular housing 200 of FIG. 11.

Referring to FIGS. 10-14, the triangular housing can hang by a cord or flexible line that is tied through the through-hole 247 in the partial cut-out triangle in the top 240 of the housing 200. If the device is used outside, it is preferable to hang the housing 200 by a cord or flexible line to the tab opening 247 on top 240 of the housing 200. Attaching a tie down cord to the opening 257 in the bottom partial triangle cut-out 256 will anchor and prevent the housing 200 from moving in the wind. Optimally can hang one triangular housing in place. Outdoor use would have the top and bottom tied down.

Indoor use of the invention 200 can have the housing 200 taped or fastened to a wall, or a ceiling or a floor or tabletop surface.

As previously described, the narrow diameter stripes are black or a contrasting color to the blue background. The stripes can be approximately ¼ inch (approximately 0.64 cm) in width, and can be painted on or printed or be a yarn material or natural cord material. As previously described, the stripes need to be impregnated or soaked with an insecticide. There should be at least twice as much blue surface area between each of the stripes than the width of the stripes.

A prototype of the triangular version has dimensions where each of the rectangular sections is approximately 5 inches (approximately 12.70 cm) wide on each side and the housing is approximately 9 inches (approximately 22.86 cm) tall The rectangular cut-outs 217, 227, 237 along the faces 210, 220, 230 are used to allow for a food attractant (such as but not limited to Manna®, mixture of protein, fiber for calves, or a fly bait, such as previously described to be put inside of the box.

The disassembled version of the triangular housing 200 shown in FIG. 10 can also be used as a fly trap and killer by merely hanging the unassembled version on a surface, such as a wall, and the like.

Figure 15:
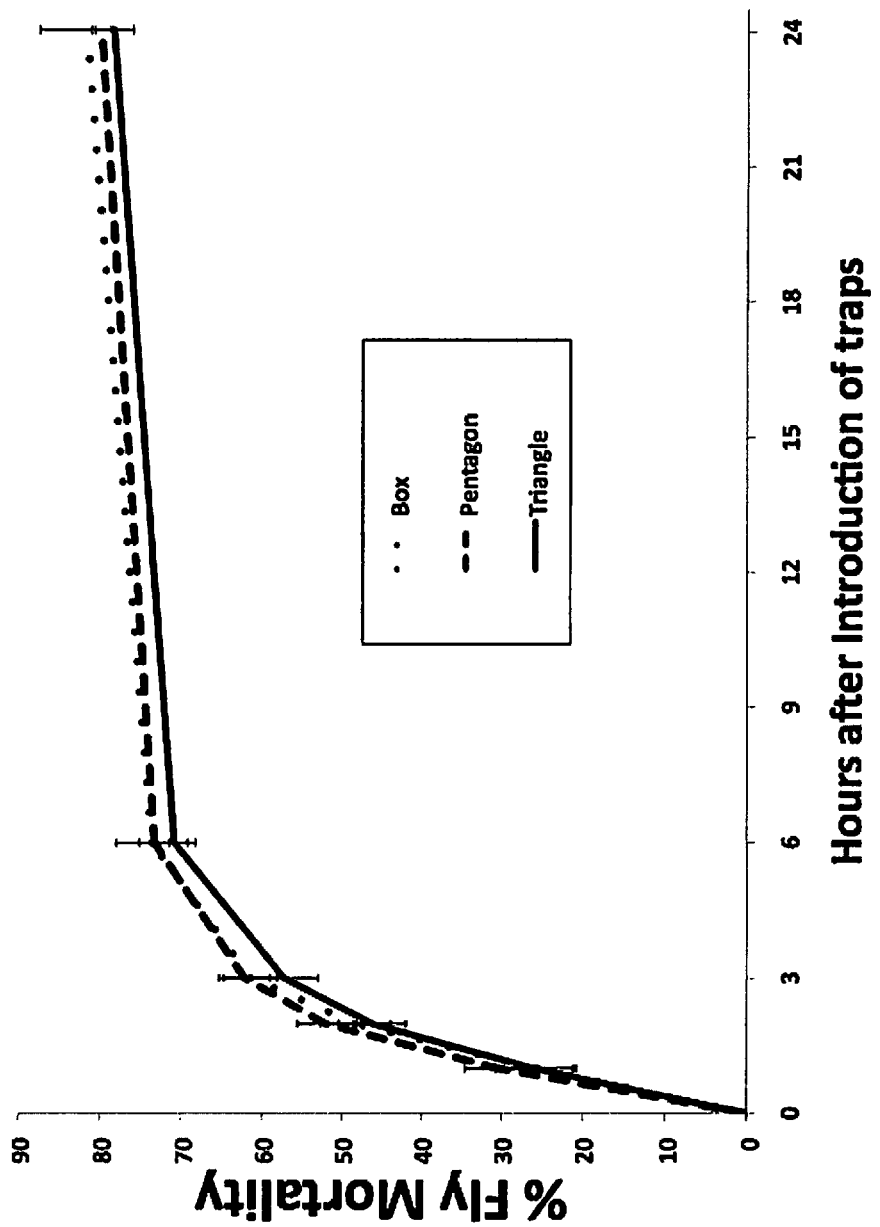
FIG. 15 is a graph of fly mortality rate versus hours after introduction of traps of a box, pentagon and triangular shaped housing embodiments of the invention.

FIG. 15 is a graph of fly mortality rate versus hours after introduction of traps of a box, pentagon and triangular shaped housing embodiments of the invention. The box version refers to the two hanging boxes shown and described in reference to FIG. 1. The pentagon version refers to pentagon shaped housing shown and described in FIG. 18. The triangular version refers to the housing shown and described in reference to FIGS. 10-14 of the invention.

Testing of the three invention traps was done over a 24 hour window. Each of the traps tested were located in a separate closed room in a building at the University of Florida, Gainesville, Fla. in 2011. A certain volume of flies were introduced into each room and the totals were counted at the end of the test runs. Each trap was tested over a 24 hour window. At the end of each test, all flies found alive in the closed room were counted and all dead flies were counted to calculate percent (%) fly mortality rates. The results of each test covered between approximately 100 to approximately 300 flies.

From FIG. 15, it shown that basically all three versions killed substantially the same amount of flies over a 24 hour time period.

Figure 16:
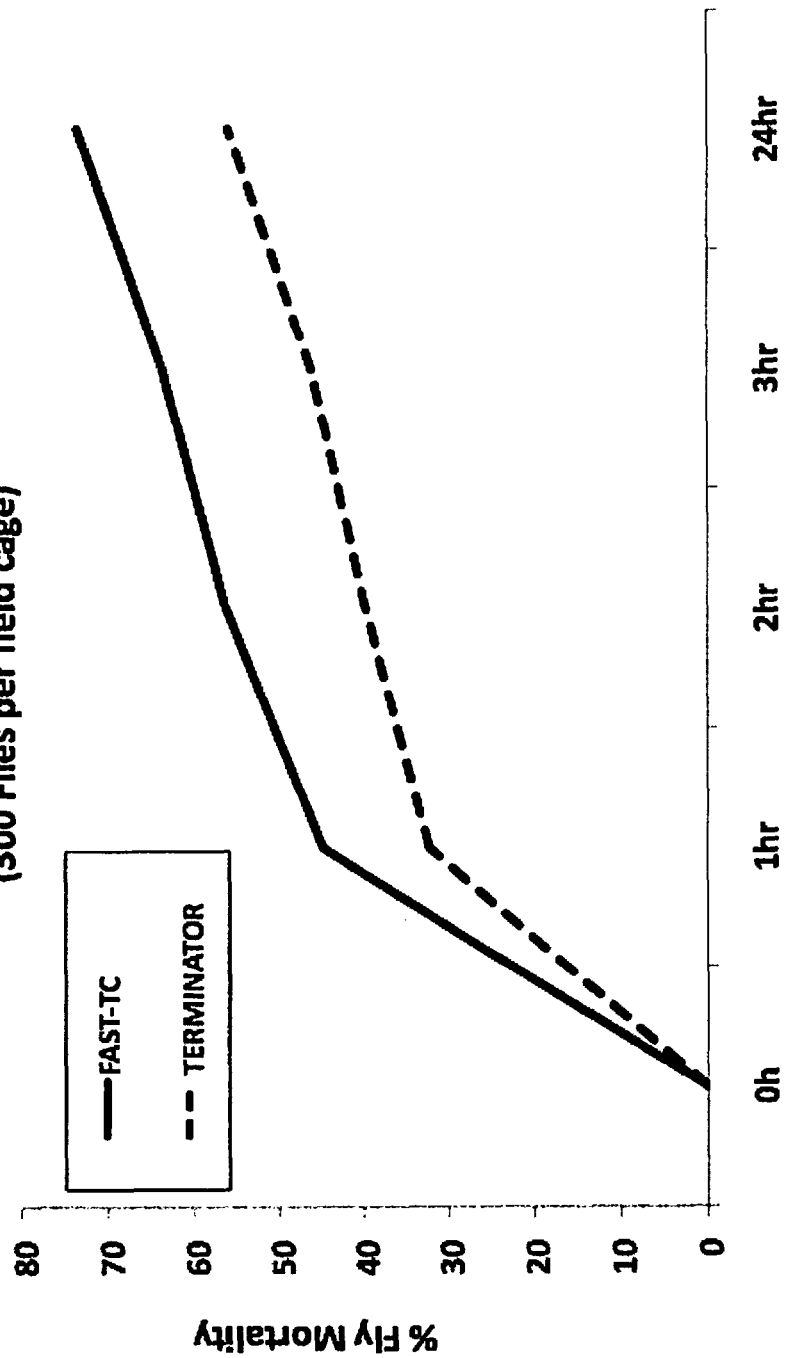
FIG. 16 is a graph of fly mortality percents versus hours after introduction FAST-TC and FLY TERMINATOR® traps.

Triangle version more durable, easier to manufacture, and uses the least amount of material compared to box version, pentagon version, and the like FIG. 16 is a graph of fly mortality percents versus hours after introduction FAST-TC and FLY TERMINATOR® traps.

The FAST-TC-Fly Attractant System described in reference to FIG. 1 with Toxicant Treated Cord. The box version used here, had similar kill ratios to the triangular version.

The FLY TERMINATOR® traps manufactured by Farnam Companies Inc. an insecticide-free fly trap generally for use around livestock operations, and uses a reusable, durable plastic gallon jug traps that claims to trap up to 35,000 flies. The trap uses a fly attractant that combines feeding stimulants with a fly sex pheromone to attract flies to the gallon jug traps.

Testing both the invention box version of FIG. 1 with the FLY TERMINATOR® trap was done over a 24 hour window. Each of the traps tested were located in a separate closed room in a building at the University of Florida, Gainesville, Fla. in 2011. A certain volume of flies were introduced into each room and the totals were counted at the end of the test runs. Each trap was tested over a 24 hour window. At the end of each test, all flies found alive in the closed room were counted and all dead flies were counted to calculate percent (%) fly mortality rates. The results of each test covered approximately 300 flies.

The results of the testing are depicted in FIG. 16, where the invention box has a kill rate of approximately 73% versus approximately 56% compared to the FLY TERMINATOR® product at 24 hours. The invention killed approximately 30% more flies than the TERMINATOR® product. Overtime the difference between the two traps will significantly increase because of the limited volume of space in the FLY TERMI- NATOR® product. Also, with the FLY TERMINATOR® product, too many flies will end up in the flies flying out of the FLY TERMINATOR® product device. The "cookie" jar type housing of the FLY TERMINATOR® product has limited space which makes the product unusable when too many flies are inside. Too many cadavers in the FLY TERMINATOR® product will result in the trap becoming dried up and unusable.

With the invention, the flies are killed away from the trap and not inside as is required by the FLY TERMINATOR® product. A single treatment of insecticide with the invention trap can kill 40,000 flies. Also the treated narrow diameter stripes in the invention can be replenished, by using an eye dropper or spray bottle or squeeze bottle of insecticide.

Figure 17:
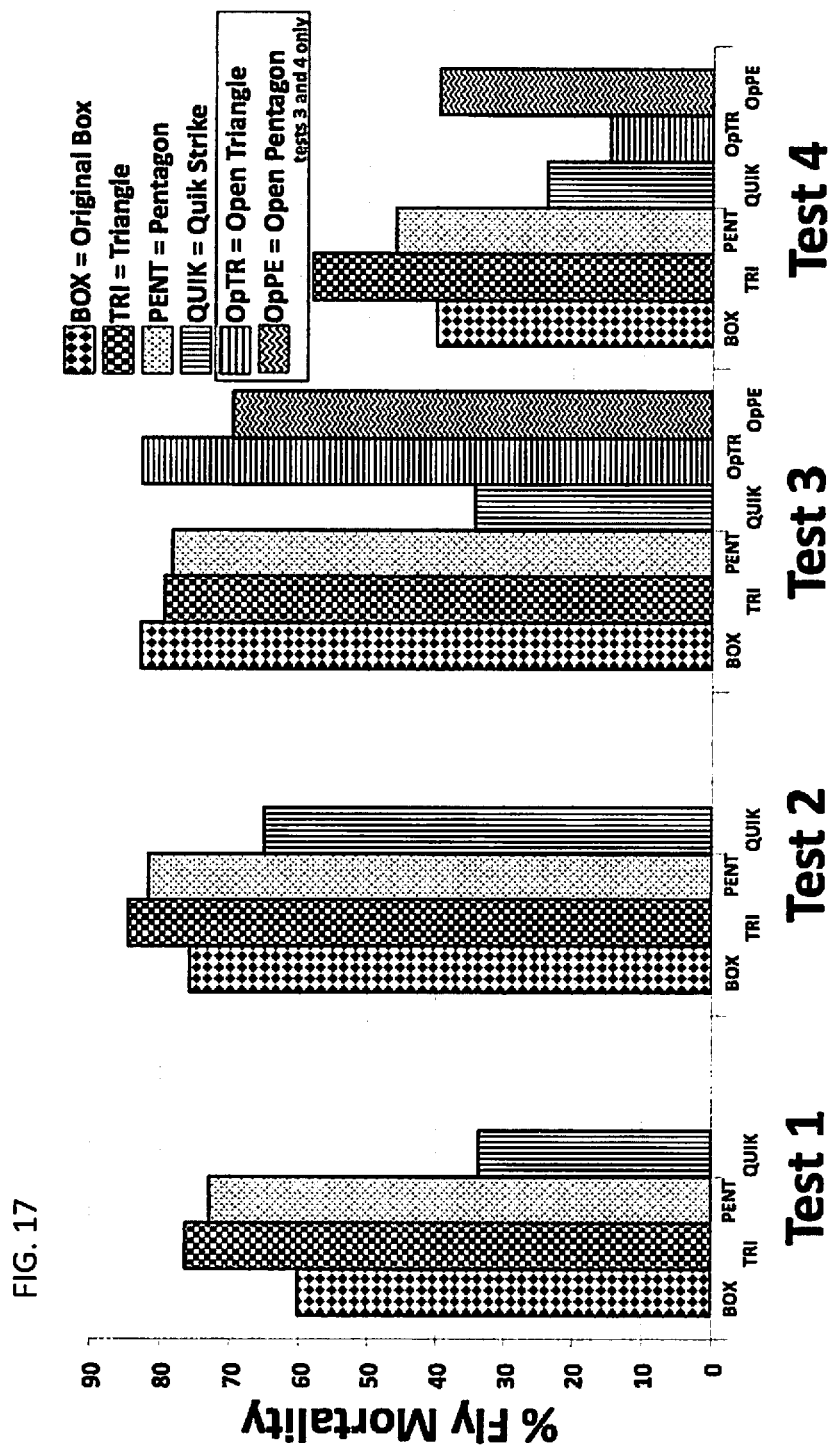
FIG. 17 is a graph of fly mortality rates versus four tests comparing original box, triangular housing, pentagon housing of the invention against a QUIKSTRIKE® product.

FIG. 17 is a graph of fly mortality rates versus four tests which compare the original invention box, triangular housing trap, pentagon housing trap, and the QUIKSTRIKE® product, which is a granular type bait product.

Granular type bait products are well known for killing flies. The QUIKSTRIKE® Fly Scatter Bait manufactured by Wellmark International is a fast-acting product granular bait product that was developed to control nuisance house flies. Dinotefuran, the active ingredient in QUIKSTRIKE® Fly Scatter Bait, is an EPA approved, broad spectrum insecticide approved for control of nuisance house flies. QUIKSTRIKE® Fly Scatter Bait is approved for a variety of locations where house flies are a problem. Other types of granular bait products similar to QUIKSTRIKE include QUICKBAYT® and MAXFORCE® Granular Fly Bait manufactured by Bayer Corp.

Four tests were done over several weeks. Test 1 tested four traps simultaneously at a test facility in Manchester, England on Aug. 31, 2010. The four traps includes the original invention box trap shown in FIG. 1, the triangular shaped trap described in FIGS. 10-14, the pentagon shaped trap, shown and described in reference to FIG. 18, and the QUIKSTRIKE® Fly Scatter Bait Test 2 tested the same four traps simultaneously at the same location on Sep. 1, 2010.

Test 3 tested the same four traps plus an Open Triangle invention trap and an Open Pentagon invention trap. Both the latter traps are unassembled versions of the invention triangle trap and the invention pentagon shaped traps, where generally flat sheet versions can be hung against walls, and the like. The Open Triangle version was an unassembled triangular trap which was used by putting a flat unassembled trap into the room space where the testing occurred. The Open Pentagon version was an unassembled pentagon trap which was used by putting a flat unassembled trap into the room space.

Each of the traps tested were located in a separate closed room in a building. A certain volume of flies were introduced into each room and the totals were counted at the end of the test runs. Each trap was tested over a 24 hour window. At the end of each test, all flies found alive in the closed room were counted and all dead flies were counted to calculate percent (%) fly mortality rates. The results of each test covered between approximately 100 to approximately 300 flies.

FIG. 17 shows that with the 4 tests, the pentagon and the triangle traps performed as well as the original box trap (if not a somewhat better). The same traps when used flat (not assembled to form a 3-dimensional trap) can work just as well. This allows the new model traps to be used disassembled and mounted flat on a wall, or assembled and hung from some support without resting against a surface (wall) as the disassembled trap was.

FIG. 17 shows that the invention traps kill substantially more flies than the well known QUIKSTRIKE® Fly Scatter Bait.

Figure 18:
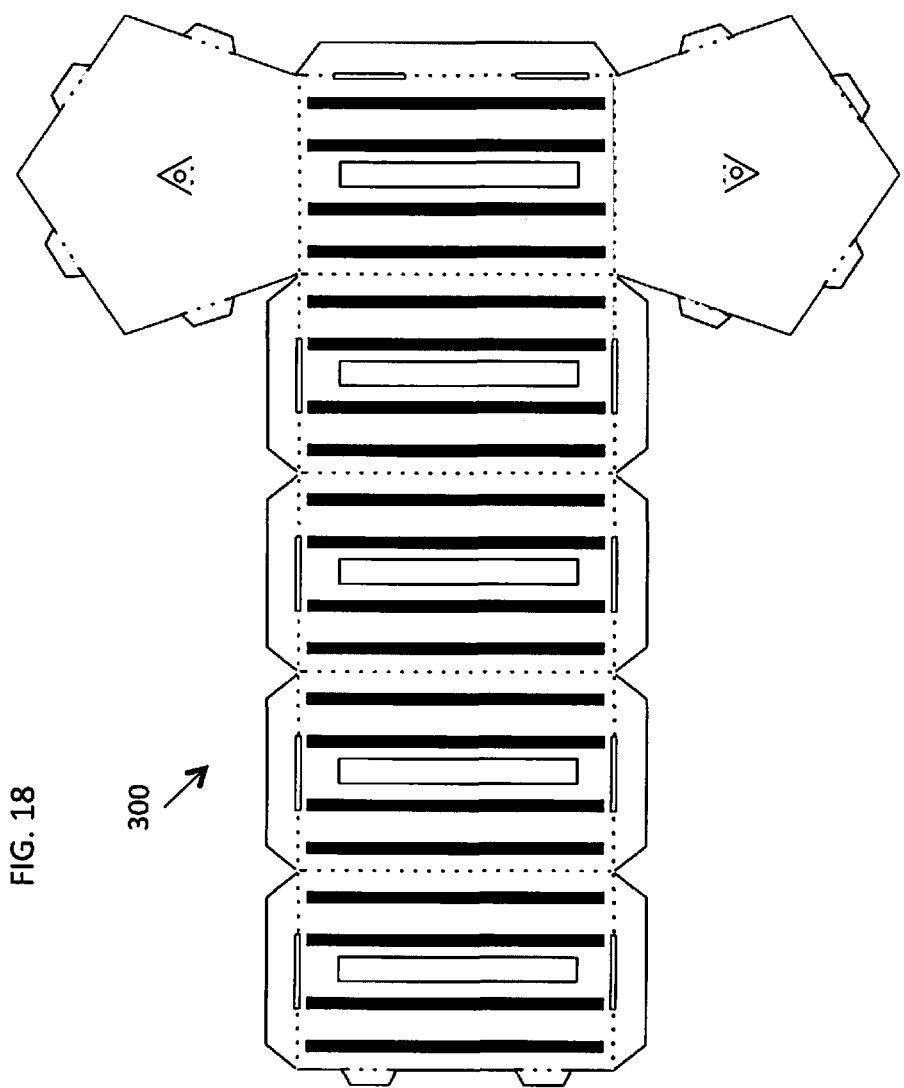
FIG. 18 is an unassembled view of a pentagon shaped trap housing of the invention.
Figure 19:
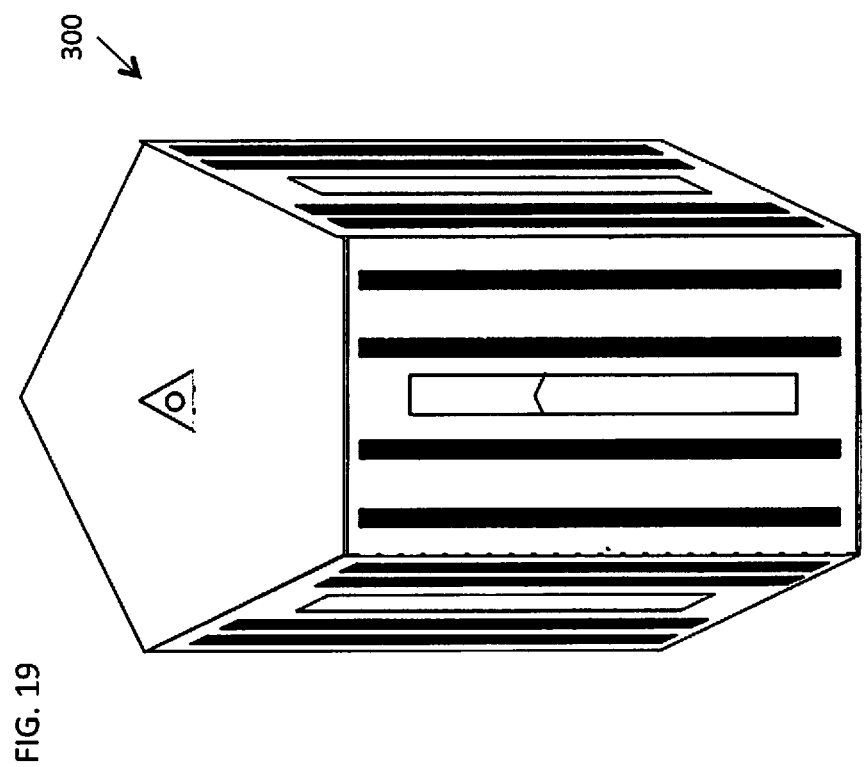
FIG. 19 is an assembled view of a pentagon shaped trap housing of FIG. 18.

FIG. 18 is an unassembled view of a pentagon shaped trap housing 300 of the invention. FIG. 19 is a perspective view of an assembled pentagon shaped housing 300 of the invention. The pentagon version can be assembled and used in a similar manner to the triangular version previously described by folding sections and inserting the tabs into slots. The unassembled version of the pentagon can also be used as a fly trap for killing flies without having to be assembled, similar to the other versions previously described.

The pentagon version can also include similar insecticide treated narrow diameter stripes, the stripes being painted on, printed on, or natural fiber cords, such as those previously described.

Figure 20:
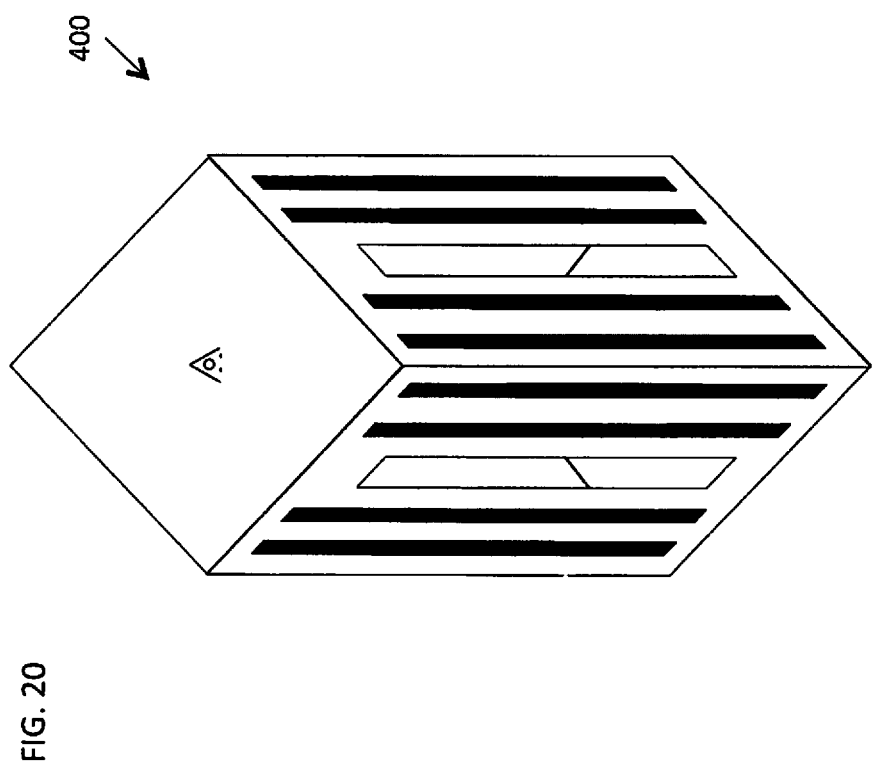
FIG. 20 is an assembled view of a single rectangular shaped trap housing of the invention.

FIG. 20 is an assembled view of a single rectangular shaped trap housing 400 of the invention. The rectangular version can be assembled and used in a similar manner to the triangular version previously described by folding sections and inserting the tabs into slots. The unassembled version of the pentagon can also be used as a fly trap for killing flies without having to be assembled, similar to the other versions previously described.

The rectangular version can also include similar insecticide treated narrow diameter stripes, the stripes being painted on, printed on, or natural fiber cords, such as those previously described.

The invention can be sold in kit forms, with rechargeable/refillable components. For example, a kit can include a spray bottle, droplet dispenser, and the like with a liquid type insecticide so that the yarn type strips can be recharged over time when the attractant has worn out.

The invention can allow for having built in ampules of insecticide attractant that is attached to an upper end of the strips/cords so that the strips/cords are constantly being replenished where the insecticide is metered out over time.

A preferred embodiment of the invention can use the color blue as the background with insecticide treated black stripes, such as the previously described painted or lines or natural cords that simulate a harborage for flies as being attractive.

The cords that can be used can include but are not limited to a natural fiber cord, such as but not limited to a wool cord, a wool blend, combinations thereof, and the like.

The invention has great applicability for home use, outside garden and patio and porch and deck use, and the like. Additionally, the invention can be made to be inexpensive to consumers. The invention can also be used in other settings, such as but not limited to indoor and outdoor locations, such as but not limited to restaurants, outdoor cafes, hospitals, military locations, dairies, picnic tables, and the like where flies and similar flying insects are a problem.

While the drawings show the container housings having rectangular shapes, the housings can have other geometrical shapes such as variations of cylindrical, triangular shapes, and the like.

Although the invention describes the cord(s) and strip(s) as being black, the cord(s) and strip(s) can be other dark colors, such as but not limited to dark blue, navy blue, forest green, and the like.

Also, the cord(s) and strip(s) used in the hanging containers (cylinders, boxes, and the like) can be painted or printed on line(s) that are oriented vertically and/or horizontally and/or in other directions across the surface of the substrate (containers, housing, cards). The line(s) can be of a different color that contrasts with the substrate surface on which it is directly located. The line(s) can also if needed be treated with an insecticide.

Additionally, the solid side surfaces of the hanging containers, can additionally have sticky side surfaces thereon that are about the narrow diameter elongated members.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A device for attracting and killing flies for use in both an unassembled state and in an assembled state, comprising:
    a single substrate planar member having a solid side wall surface with a first color substantially across an exterior face of the surface, the single substrate member includes a first generally rectangular planar member side by side to a second generally rectangular planar member side by side to a third generally rectangular planar member, and a first triangular planar member and a second triangular planar member each positioned on opposite sides of only one of the first and the third generally rectangular planar members, each of the first and the second triangular planar members having spaced apart tabs for allowing the first and the second triangular planar members to be attached to the first and the second and the third generally rectangular planar members in the assembled state;
    at least one narrow diameter elongated member having a portion directly located on the solid side wall surface, having a contrasting color which contrasts with the first color on the solid side wall surface; and
    a substance associated with the device for killing or catching flies, wherein the at least one narrow diameter elongated member is capable of replicating a crack shape so as to visually attract the flying insects to the crack shape, wherein the single substrate planar member with the at least one narrow diameter elongated member and the substance is useful as a device for attracting and killing flies in an unassembled flat planar state, and the single substrate planar member with the at least one narrow diameter elongated member and the substance is useful as a device for attracting and killing flies when folded into a triangular shaped housing;
    at least one cut out in a middle portion of at least one of the triangular members to form a fold out member for allowing the device to be hanged in both the assembled state and the unassembled state, and the device is useful for also attracting and killing flies in the assembled state.

2. The device of claim 1, wherein the color on the at least one narrow diameter elongated member is a darker color than the first color.

3. The device of claim 1, wherein the color on the at least one narrow diameter elongated member is black.

4. The device of claim 1, wherein the color on the at least one narrow diameter elongated member is a lighter color than the first color.

5. The device of claim 1, wherein the at least one narrow diameter elongated member is painted or printed on the solid side wall surface is treated with insecticide.

6. The device of claim 5, wherein the insecticide includes imidacloprid bait.

7. The device of claim 1, wherein the at least one narrow diameter elongated line is a natural fiber cord treated with insecticide.

8. The device of claim 7, wherein the insecticide includes imidacloprid bait.

9. The device of claim 7, wherein the natural fiber cord is black wool yarn.

10. The device of claim 1, wherein the first generally rectangular planar member and the second generally rectangular planar member and the third generally rectangular planar member, are include substantially identical rectangular shapes.

11. The device of claim 1, further comprising:
    perforations between the first generally rectangular planar member and the second generally rectangular planar member and the third generally rectangular planar member.

12. The device of claim 1, further comprising:
    tabs extending outward from the first generally rectangular planar member and the second generally rectangular planar member and the third generally rectangular planar member, for allowing the single substrate planar member to be assembled into an assembled state.

13. The device of claim 1, wherein the first color includes blue.

14. A triangular shaped housing device for attracting and killing flies, comprising:
    a first rectangular shaped sidewall;
    a second rectangular shaped side wall side by side with the first rectangular shaped sidewall;
    a third rectangular shaped sidewall side by side with the second rectangular shaped sidewall, wherein the first and the second and the third triangular shaped sidewalls form a housing having a triangular cross-sectional shape, with the housing having an open top and an open bottom;
    a top triangular shaped sheet extending outward from one end of the first rectangular shaped sidewall, for covering the top of the housing having the triangular cross-sectional shape, the top triangular shaped sheet having spaced apart tabs for allowing the top triangular shaped sheet to attach to the second and third rectangular shaped sidewall;
    a bottom triangular shaped sheet extending outward from a second end of the first rectangular shaped sidewall, for covering the bottom of the housing having the triangular cross-sectional shape, the bottom triangular shaped sheet having spaced apart tabs for allowing the top triangular shaped sheet to attach to the second and third rectangular shaped sidewall;
    a first color substantially covering an exterior face surface of at least one of the first, second, and third rectangular shaped sidewalls;
    at least one narrow diameter elongated member having a portion directly located on the exterior face surface with the first color, having a contrasting color which contrasts with the first color; and
    a substance associated with the device for killing or catching flies, wherein the at least one narrow diameter elongated member is capable of replicating a crack shape so as to visually attract the flying insects to the crack shape; and
    at least one cut out in a middle portion of at least one of the top and bottom triangular shaped sheets to form a fold out member for allowing the device to be hanged in both an assembled state and unassembled state for attracting and killing flies in both the assembled state and an unassembled state.

15. The device of claim 14, wherein the first rectangular shaped sidewall and the second rectangular shaped side wall and the third rectangular shaped sidewall and the top triangular sheet and the bottom triangular sheet are formed from a single planar member.

16. The device of claim 14, wherein the first rectangular shaped sidewall and the second rectangular shaped sidewall and the third rectangular shaped sidewall are each substantially identical rectangular shapes.

17. The device of claim 14, wherein the top triangular sheet and the bottom triangular sheet are each substantially identical triangular shapes.

18. The device of claim 14, further comprising:
perforations between the first rectangular shaped sidewall and the second rectangular shaped sidewall and the third rectangular shaped sidewall.

19. The device of claim 14, further comprising:
tabs extending outward from the first rectangular shaped sidewall and the second rectangular shaped sidewall and the third rectangular shaped sidewall for allowing the device to be assembled from a planar shaped member into the housing having the triangular cross-sectional shape.

\* \* \* \* \*